TUNER WITH CIRCUIT COMPONENT SUPPORTING PARTITION

Filed April 14, 1965

Inventors:
Erich Wolter
Karl Schwarz
By: Spencer & Kaye
Attorneys

United States Patent Office 3,317,864
Patented May 2, 1967

3,317,864

TUNER WITH CIRCUIT COMPONENT SUPPORTING PARTITION

Erich Wolter, Ingolstadt, and Karl Schwarz, Eitensheim, Germany, assignors to Telefunken Patentverwertungs-gesellschaft m.b.H., Ulm (Danube), Germany Filed Apr. 14, 1965, Ser. No. 448,145
Claims priority, application Germany, Apr. 14, 1964, T 26,007
12 Claims. (Cl. 334—85)

The present invention relates to a tuner.

More particularly, the present invention relates to tuners having adjacent tank circuits and at least one transistor which is arranged within a recess of an electrically conductive partition that separates and is common to two adjacent tank circuits, this transistor having an electrode that is connected to the partition, via a capacitor, insofar as high-frequency is concerned.

There exists one type of tuner in which the housing is divided into tank circuit chambers by means of partitioning walls. These partitions are provided with recesses into each of which a transistor may be at least partly inserted through bores in the housing. In order that the common electrode, e.g., the base electrode in the case of a transistor connected in common-base configuration, be connected as low-ohmically as possible to the partition, which itself constitutes the outer conductor of the tank circuit, one plate of a thin disc-like capacitor is soldered flat on the partition, in the immediate vicinity of the respective recess, the other plate of this capacitor being connected with the base electrode. The arrangement is such that the axis of the transistor extends approximately parallel to the axis of the inner conductor of the tank circuit, with the axis of the capacitor, whose purpose it is to block the flow of the direct current, being approximately at right angles to the transistor axis.

It has been found that such an arrangement is not able to produce the desired amplification without simultaneously producing increased feedback, and this, it will be appreciated, adversely affects the signal-to-noise ratio.

It is, therefore, the primary object of the present invention to provide an arrangement which overcomes the above drawbacks and, with this object in view, the axes of the capacitor and of the transistor are, in accordance with the present invention, at least approximately aligned with each other in a straight line, this line being defined by the intersection of the plane of the partition with a plane parallel to the axis of the inner conductor of the tank circuit. In this way, the adverse effect of the wall currents are to a large extent eliminated, and the amplification is increased without, however, producing any significant feedback.

Additional objects and advantages of the present invention will become apparent upon consideration of the following description when taken in conjunction with the accompanying drawings in which.

Figure 1:
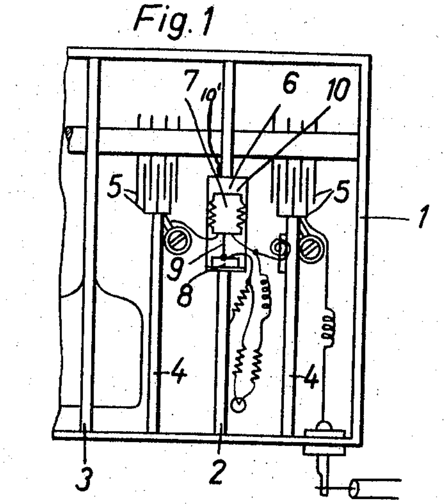
FIGURE 1 is a fragmentary view of a tuner in which the transistor and the D.C. blocking capacitor are arranged in accordance with the present invention.

Referring now to the drawings, FIGURE 1 thereof shows part of a tuner having a housing 1 which is divided into adjacent chambers by means of electrically conductive partitions 2, 3, which serve as outer conductors of the coaxial tank circuits. Each of the tank circuits has an inner conductor 4, one end of which is connected with the outer conductor, i.e., the wall of the chamber, while the other end of each inner conductor is connected to the stator of a respective tuning capacitor 5. The partition 2 is shown as being provided with a recess 6 within which is arranged a transistor 7 and a D.C. blocking capacitor 8, the latter being connected to the appropriate electrode 9 of the transistor.

According to the present invention, the axis of the transistor 7 and the axis of the capacitor 8 are so oriented as to be aligned with each other and to lie in a straight line which is formed by the intersection of the plane of the partition 2 and a plane which is parallel to the axis of the inner conductor 4, as a result of which—as explained above, the adverse effects of the wall currents are largely eliminated which, in turn, means increased amplification without a concomitant increase in feedback.

According to a further feature of the present invention, the transistor 7 and capacitor 8 are combined into a unitary structural entity which comprises mounting element means, such as plate 10, which has a two leg portion 12, 12*a*, at substantially right angles to each other. The transistor 7 is secured to the plate 10 by spring means such as two opposite resilient tongues 11, which may be integral with the leg portion 12*a* of the plate 10 and which at least partly encompass the transistor, and one plate of the capacitor 8 is soldered to the other leg portion 12. The structural entity incorporating the plate 10, the transistor 7 and the capacitor 8 can be assembled outside of the tuner proper, whereafter the entity as a whole can be inserted into the tuner and be secured to the partition, for example by soldering.

In order to facilitate centering of the entity in the recess 6, the plate 10 is provided with centering means such as protuberances, beads or tongues, or the like, one of which is shown, for example at 10'.

Figure 2:
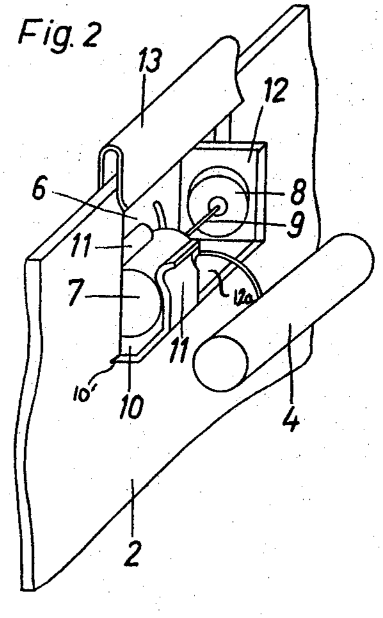
FIGURE 2 is a fragmentary perspective view showing the position of the transistor and capacitor in a recess of the partition.

The recess 6, one side of which—the upper side as viewed in FIGURE 2—is open, may, after the transistor and capacitor unit has been put in place, be closed off by means of a bent, plate-like spring clip 13 of U-shaped cross section, which is placed on the partition 2 to straddle the recess 6 and is then pushed down until it engages the upper end of the leg portion 12.

By virtue of the above arrangement, not only will the electrical drawbacks of the prior art constructions be avoided, but also, the mechanical assembly of the parts is greatly facilitated.

It will be understood that the above description of the present invention is susceptible to various modifications, changes, and adaptations, and the same are intended to be comprehended within the meaning and range of equivalents of the appended claims.

What is claimed is:

1. A tuner incorporating at least two adjacent tank circuits each having inner and outer conductors and including at least one electrically conductive partition which is common to the two adjacent tank circuits and which forms part of the outer conductor of each, said partition being provided with a recess, there being arranged in said recess a transistor having an axis and a D.C. blocking capacitor having an axis, one electrode of said transistor being connected to one plate of said capacitor, said transistor and capacitor being oriented with their axes lying at least approximately in the same straight line, said straight line being defined by the intersection of the plane of said partition and a plane which is parallel to the axis of said inner conductor.

2. A tuner as defined in claim 1 wherein said capacitor is a disc-shaped capacitor.

3. A tuner as defined in claim 1, further comprising a mounting element carrying said transistor and said capacitor, said mounting element being arranged within said recess.

4. A tuner as defined in claim 3 wherein said mounting element includes spring means for holding said transistor.

5. A tuner as defined in claim 4 wherein said mounting element is a plate and wherein said spring means comprise two opposite resilient tongues which at least partly encompass said transistor.

6. A tuner as defined in claim 3 wherein said mounting element is a plate having two angled leg portions, said transistor being secured to one of said leg portions and said capacitor being secured to the other of said leg portions.

7. A tuner as defined in claim 3 wherein said mounting element, said transistor and said capacitor form a unitary structural entity.

8. A tuner as defined in claim 7 wherein said entity is insertable into said recess and securable therein to said partition.

9. A tuner as defined in claim 3 wherein said mounting element is provided with means for enabling said mounting element to be centered in said recess.

10. A tuner as defined in claim 3 wherein said recess is open to one side and where the tuner further comprises a clip arranged on said partition for closing said open side of said recess.

11. For use in a tuner having an electrically conductive partition which constitutes a wall common to two adjacent tank circuit chambers and which is provided with a recess, a structural entity positionable in said recess and comprising a mounting element, a transistor secured to said mounting element, and a capacitor also secured to said mounting element, one plate of said capacitor being electrically connected to an electrode of said transistor, said transistor and said capacitor having axes which are aligned along a straight line, said mounting element comprising a plate having two leg portions forming right angles with each other, one of said leg portions being provided with two opposite, resilient tongues which are integral with said one leg portion and which at least partly encompass said transistor, and said capacitor having one plate which is secured to the other of said leg portions.

12. A structural entity as defined in claim 11 wherein said plate is provided with means for enabling said structural entity to be centered with respect to the recess.

References Cited by the Examiner

UNITED STATES PATENTS

| | | | |
|---|---|---|---|
| 2,593,034 | 4/1952 | Kafka | 317—101 |
| 2,633,526 | 3/1953 | Snyder | 317—101 |
| 2,995,713 | 8/1961 | Thompson | 333—82 |
| 3,252,095 | 5/1966 | Carlson | 334—41 |
| 3,253,239 | 5/1966 | Bachnick et al. | 333—83 |

ELI LIEBERMAN, *Primary Examiner.*

HERMAN K. SAALBACH, R. F. HUNT, *Assistant Examiners.*